(12) United States Patent
Wood et al.

(10) Patent No.: US 12,516,257 B2
(45) Date of Patent: Jan. 6, 2026

(54) TECHNOLOGIES FOR REDUCING THE VISCOSITY OF CRUDE OIL

(71) Applicant: Southwest Research Institute, San Antonio, TX (US)

(72) Inventors: James Wood, San Antonio, TX (US); Sergio Treviño, Monterrey (MX)

(73) Assignee: Southwest Research Institute, San Antonio, TX (US)

( * ) Notice: Subject to any disclaimer, the term of this patent is extended or adjusted under 35 U.S.C. 154(b) by 123 days.

(21) Appl. No.: 18/350,012

(22) Filed: Jul. 11, 2023

(65) Prior Publication Data
US 2023/0348802 A1 Nov. 2, 2023

Related U.S. Application Data

(62) Division of application No. 17/452,458, filed on Oct. 27, 2021, now abandoned.

(51) Int. Cl.
| | | |
|---|---|---|
| *B01F 31/80* | (2022.01) | |
| *B01F 35/90* | (2022.01) | |
| *C10G 21/12* | (2006.01) | |
| *C10G 21/14* | (2006.01) | |
| *C10G 21/16* | (2006.01) | |
| *C10G 21/20* | (2006.01) | |
| *C10G 32/02* | (2006.01) | |
| *C10G 75/00* | (2006.01) | |

(52) U.S. Cl.
CPC .............. *C10G 75/00* (2013.01); *B01F 31/80* (2022.01); *B01F 35/90* (2022.01); *B01F 2035/99* (2022.01); *C10G 2300/206* (2013.01); *C10G 2300/4075* (2013.01); *C10G 2300/802* (2013.01)

(58) Field of Classification Search
CPC ......... B01F 31/80; C10G 21/12; C10G 21/14; C10G 21/16; C10G 21/20; C10G 32/02; C10G 2300/802
See application file for complete search history.

(56) References Cited

U.S. PATENT DOCUMENTS

2008/0217211 A1* 9/2008 Chornet .................. B01J 19/24
208/106

OTHER PUBLICATIONS

J.-R. Lin and T. F. Yen, An Upgrading Process Through Cavitation and Surfactant, 7 Energy & Fuels 111-118 (1993).*
P. Kaushik et al., Ultrasound Cavitation Technique for Up-Gradation of Vacuum Residue, 93 Fuel Processing Technology 73-77 (2012).*
Z. Yang et al., Upgrading Vacuum Residuum by Combined Sonication and Treatment with a Hydrogen Donor, 48 Chemistry and Technology of Fuels and Oils 426-435 (2013).*
M. Askarian et al., Heavy Oil Upgrading via Hydrodynamic Cavitation in the Presence of an Appropriate Hydrogen Donor, 151 J. Petrol. Sci. Eng. 55-61 (2017).*
N. A. Botijonovich and S. A. Abdurahimov, Preparation of Surfactants Reducing the Viscosity of Heavy Oil from Raw Fatty Acid of Cotton Soap Stock, Austrian Journal of Technical and Natural Sciences, pp. 89-92, (2017).*
C. Wan et al., Experimental Study on Viscosity Reduction of Heavy Oil by Hydrogen Donors Using a Cavitating Jet, 9 RSC Adv. 2509-2515 (2019).*

* cited by examiner

*Primary Examiner* — Randy Boyer
(74) *Attorney, Agent, or Firm* — Grossman, Tucker, Perreault & Pfleger, PLLC (57) ABSTRACT

Technologies for reducing the viscosity of heavy crude oil are disclosed. In embodiments the technologies utilize a combination of a processing additive composition (PAC) and hydrodynamic cavitation to produce an oil composition having a viscosity V2, wherein V2 is at least 40% less than a viscosity V1 of untreated heavy crude oil. PACs, systems for reducing the viscosity of heavy crude oil using a combination of a PAC and hydrodynamic cavitation, and methods for reducing the viscosity of heavy crude oil with a combination of a PAC and hydrodynamic cavitation are also disclosed.

12 Claims, 3 Drawing Sheets

TECHNOLOGIES FOR REDUCING THE VISCOSITY OF CRUDE OIL

FIELD

The present disclosure relates to technologies for reducing the viscosity of crude oil. In particular, the present disclosure relates to processing additive compositions for reducing the viscosity of heavy hydrocarbons such as heavy crude oil, systems for reducing the viscosity of heavy crude oil, and methods of reducing the viscosity of heavy crude oil.

BACKGROUND

Transportation of heavy hydrocarbons such as heavy crude oil via pipeline or by other means is of continuing interest to the petroleum industry. Heavy and extra-heavy crude oils (individually and collectively referred to herein as "heavy crudes") are challenging to transport via pipeline due to their high viscosity, asphaltene and paraffin content, relatively high content of formation water, salt content, and corrosiveness. Despite such issues, petroleum producers worldwide are often interested in transporting heavy crude oil to refineries for processing. For example, at least 50% of crude oil reserves in Mexico are classified as heavy and extra-heavy crude oil. In Canada, about 700,000 barrels of synthetic crude oil per day are produced from heavy crude oil, bitumen, and tar sands that is transported to refineries in Canada and the United States.

Heavy crude oil and bitumen production and transport are significantly more capital and energy intensive than the production and transportation of lighter oil. Such expenses are due to the high viscosity of heavy crudes at reservoir and normal transport conditions, as well as the presence of flow impeding components in heavy crudes, such as asphaltenes, heavy ends, and sulfur, which can make heavy crude oil difficult to produce, transport, and refine.

Several cost intensive technologies have been developed to facilitate the transport of heavy hydrocarbons such as heavy crudes by pipeline. For example, transportation of heavy crude by pipeline may be facilitated by reducing the pressure drop in the pipeline to lower the overall pumping power needed to pump the heavy crude oil a desired distance. Several technologies for reducing the pressure drop in a pipeline are known, including: 1) viscosity reduction by blending/diluting heavy crude with lighter material; 2) heating, emulsification, and pour point reduction; 3) friction reduction (e.g., using drag reducers and/or core annular flow); and 4) in-situ upgrading. Such techniques are generally quite costly and may involve the addition of large amounts of solvents, chemicals, and/or energy. They are also quite technically demanding, utilize cost intensive equipment and infrastructure, can be labor and materials intensive. The challenges with transporting heavy crude can be compounded by the fact that oil producing sites are often in remote locations. Such locations may not have access to the resources needed to effectively implement processes that enable pipeline transport of heavy crudes.

Accordingly, there is a need in the art for the development of new technologies that facilitate transport of heavy crude oils via pipeline and other means. The present disclosure is aimed at such needs.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

DETAILED DESCRIPTION

As noted in the background, existing technologies for transporting heavy crudes are often costly and use large amounts of chemicals and/or energy. They are often also technically demanding and entail the use of expensive capital equipment and infrastructure. Heavy crude storage and production sites may also lack access to supplies used to facilitate transportation of heavy crudes or may otherwise be unable to implement conventional methods for their transport. A need therefore remains in the art for new technologies that can facilitate the transportation of heavy crudes, particularly via pipeline. The present disclosure is aimed at that need.

The present disclosure is generally drawn towards technologies for reducing the viscosity of heavy crude oils, making them easier to transport via pipeline and other means. In general, the technologies described herein include a processing additive composition (PAC) that can be combined with heavy crude oil having a viscosity V1 to form a first oil composition, optionally in combination with other additives such as surfactants, water, amine soap(s), or a combination thereof. The first oil composition can be subject to hydrodynamic cavitation to produce a second oil composition that has a viscosity V2, wherein V2 is at least 40% less (e.g., at least 45%, 50%, 55%, 60%, etc.) than V1. Without limitation, in embodiments the processing additive composition can be combined with heavy crude oil and optionally additional components to form a first oil composition that, when subject to hydrodynamic cavitation, results in the production of a second oil composition that has a viscosity V2 that is at least 60% less than the viscosity V1 of the heavy crude oil.

Heavy crude oils are characterized by a low (<22) API (American Petroleum Institute) gravity and a high viscosity (i.e., >1000 centipoise (cP) at 298° K). Due at least in part to their high viscosity, heavy crude oils are difficult to flow through pipelines. Tables 1 and 2 below summarize the asphaltene, resin, oil fraction composition of typical heavy crude oils, and particularly Belridge heavy crude. Table 2 also includes composition information for conventional oils, heavy oil, and residue.

TABLE 1

Typical elemental composition of heavy crude oil

| Fraction | Weight % | C | H | N | O | S |
|---|---|---|---|---|---|---|
| | | \multicolumn{5}{c}{Elementary composition based on C20+} |
| Asphaltene | 14.1 | 83.8 | 7.5 | 1.3 | 1.7 | 4.8 |
| Resin | 37.3 | 82.8 | 8.9 | 1.5 | 2.0 | 4.3 |

TABLE 1-continued

Typical elemental composition of heavy crude oil

| | | Elementary composition based on C20+ | | | | |
|---|---|---|---|---|---|---|
| Fraction | Weight % | C | H | N | O | S |
| Aromatic | 37.2 | 84.3 | 10.0 | <0.3 | 1.1 | 4.0 |
| Saturate | 11.4 | 86.6 | 13.0 | <0.3 | <0.2 | <0.1 |

TABLE 2

API and composition for conventional oil, heavy oil, and residue

| | | Typical composition/composition range (weight %) | | |
|---|---|---|---|---|
| Sample | API | asphaltene | Resin | Oil Fraction |
| Conventional Oil | >31.1 | <0.1-12 | 3-22 | 67-97 |
| Heavy Oil | 10 ≤ 22.3 | 11-45 | 14-39 | 24-64 |
| Residue | <10 | 11-29 | 29-39 | <39 |
| Belridge Heavy Crude | 13.2 | 8.69 | 30.7 | 60.7 |

The cohesion force of oils can be adjusted by increasing the temperature of the oil and/or by reducing the interfacial tension (IFT) of the oil. In the technologies described herein, a PAC and optionally other components such as additional surfactants, water, etc. are added to heavy crude to reduce its IFT and product a first oil composition. The first oil composition is then subjected to hydrodynamic cavitation, which can produce a second oil composition that includes a dispersion of polar compounds (e.g., asphaltenes) in resin and water, wherein the polar compounds have a relatively small particle size. As noted above, the second oil composition has a viscosity V2 that is substantially less than the viscosity V1 of the untreated heavy crude oil. For example, V2 may be at least 40, 45, 50, 55, or even 60% less than V1. Moreover, the second oil composition may be relatively stable, in that it may maintain V2 for a period of several hours, days, or even a week or more without needing to be subject to hydrodynamic cavitation again. Due to its lower viscosity, the second oil composition may be easier to transport via pipeline than unprocessed heavy crude.

As noted above the technologies described herein utilize a combination of a processing additive composition (PAC) and hydrodynamic cavitation to reduce the viscosity of heavy crude oil by at least about 40, 45, 50, 55, or even about 60% or more. With the foregoing in mind, one aspect of the present disclosure relates to a processing additive composition (PAC) for reducing the viscosity of heavy crude oil. In embodiments, the PAC is a water dispersible mixture that includes, consists essentially of, or consists of an aromatic solvent, at least one base solvent, at least one liquid aliphatic hydrocarbon, and an organic solvent, and optionally at least one ethoxylated phenol derived surfactant. The aromatic solvent may be present in the PAC in an amount ranging from about 10 to about 35% by weight, and is preferably present in the PAC in an amount ranging from 15 to 30% or even 15 to 25% by weight. Non-limiting examples of suitable aromatic solvents that can be used include aromatic solvents with one or two methyl radicals, such as but not limited to p-benzene, methylbenzene, 1,2-dimethylbenzene, 1,3-dimethylbenzene, ethyl-benzene, p-xylene, o-xylene, m-xylene toluene, phenol, combinations thereof, and the like. Without limitation, in embodiments the aromatic solvent is present in the PAC in the ranges noted above, and is or includes methylbenzene, 1,2-dimethylbenzene, 1,3-dimethylbenzene, or a combination thereof.

When used, the optional at least one ethoxylated phenol derived surfactant may be present in the PAC in an amount ranging from about 2.5 to about 20 weight %, and is preferably present in the PAC in an amount ranging from 5 to 15 weight %. In embodiments, the ethoxylated phenol derived surfactant is or includes alkyl and/or nonyl chains that are ethoxylated with 6 to 10 moles of ethylene oxide. Non-limiting examples of suitable ethoxylated phenol derived surfactants include [4-(2,4-dimethylheptan-3-yl) phenol and ethoxylates thereof; bisphenol ethoxylates such as $[H_2C=C(CH_3)CO_2(CH_2CH_2O)_nC_6H_{4-4}]_2C(CH_3)_{2t}$ 2,2-bis-[4-(methacryloxypolyethoxy)-phenyl]-propane; nonylphenol ethloxylates such as 2-(p-nonylphenoxy)ethanol or ethoxynonyl benzene; octylphenol ethoxylates such as TRITON® X-100 (i.e., polyethylene glycol mono[4-(1,1,3,3-tetramethylbuytyl)phenylether) sold by Fisher Scientific and polyethylene glycoloctylphenol ether; and 2-[4-(2,4,4-trimethylpentan-2-yl)phenoxy]ethanol and its other ethoxylates, combinations thereof, and the like. In any case, the ethoxylated phenol derived surfactant(s) used in the PAC may be formulated to have a hydrophilic lipophilic balance (HLB) that matches or substantially matches (e.g., within about 5%) the heavy crude oil being processed and the polarity of the asphaltene cumuli therein. As appreciated by those of skill in the art, HLB is the balance of the size and strength of the hydrophilic and lipophilic moieties of the ethoxylated surfactant. In embodiments the PAC includes at least one ethoxylated phenol derived surfactant, such as those noted above. In other embodiments, the PAC does not include at least one ethoxylated phenol derived surfactant.

The base solvent is or includes a heavy aromatic naptha that may be present in the PAC in an amount ranging from about 30 to about 70 weight %, and is preferably present in the PAC in an amount ranging from 40 to 65 weight %, or even from 40 to 60 weight %. In embodiments the base solvent is or includes a heavy aromatic naptha with a chain length between C8 and C18. For example, the heavy aromatic naptha may include or be composed of one or more aromatic compounds that contain 8 carbon atoms, one or more aromatic compounds that include from 9 to 11 carbon atoms, one or more aromatic compounds that include from 12 to 15 carbon atoms, and combinations thereof. Non-limiting examples of compounds that can be used as or in the base solvent include benzene, p-benzene, (polyethyl)benzenes, toluene, a heavy aromatic naptha 150 solvent (HAN 150) with a flash point of about 150° C., a heavy aromatic naptha 200 (HAN 200) solvent with a flash point of about 200° C., a light aromatic naptha solvent, combinations thereof, and the like. Without limitation, the base solvent is preferably a heavy aromatic naptha such as a HAN 150 or HAN 200 solvent.

The at least one liquid aliphatic hydrocarbon may be present in the PAC in an amount ranging from about 2.5 to about 12.5% by weight, and is preferably present in the PAC in an amount ranging from about 5 to about 10% by weight. In embodiments the at least one liquid aliphatic hydrocarbon is or includes a cyclic monoterpene. Non-limiting examples of suitable cyclic monoterpenes that may be used as or in the liquid aliphatic hydrocarbon include 1-methyl-4-(prop-1-en-2-yl)cyclohex-1-ene, (1S, 5S)-2,6,6-trimethylbicyclo[3.1.1] hept-2-ene, a, b, g, or other terpenols (e.g., (S)-2-(4-methyl-3-cyclohexenyl)-2-propanol, (S)-p-Menth-1-en-8-ol), or a combination thereof.

The organic solvent may be present in the PAC in an amount ranging from about 2.5 to about 15 weight %, and is preferably present in the PAC in an amount ranging from 5 to 12 weight %. Non-limiting examples of suitable organic solvents that may be used include n-methyl pyrrolidone, benzyl alcohol, and ester based solvents such as but not limited to dibasic ester solvents, dipropylene glycol dimethyl ether, and the PRIFER 6813 solvent sold by CRODA®.

In specific non-limiting embodiments, the PAC includes 15 to 25 weight % of at least one aromatic solvent; from 5 to 15 weight % of at least one ethoxylated phenol derived surfactant; from 40 to 65 weight % of a base solvent; from 5 to 10 weight % of at least one liquid aliphatic hydrocarbon; and from 5 to 12 weight % of organic solvent, wherein such components include or are selected from the components noted above. In embodiments, the aromatic solvent is present in the PAC in above noted range and is or includes methylbenzene, 1,2-dimethylbenzene, 1,3 dimethylbenzene, p-xylene with one or two methyl radicals, o-xylene with one or two methyl radicals, and combinations thereof; the ethoxylated phenol derived surfactant is present in the PAC in the above noted range and is or includes is [4-(2,4-dimethylheptan-3-yl)phenol and ethoxylates thereof; the base solvent is present in the above noted range and is a heavy aromatic naptha; the liquid aliphatic hydrocarbon is present in the PAC in the above noted range and is or includes 1-methyl-4-(prop-1-en-2-yl)cyclohex-1-ene, (1S, 5S)-2,6,6-trimethylbicyclo[3.1.1]hept-2-ene, or a combination thereof; and the organic solvent is present in the PAC in the above noted range and is or includes an ester based solvent such as PRIFER 6813 or another suitable organic solvent.

In specific non-limiting embodiments, the PAC includes 20 to 30 weight % of at least one aromatic solvent; from 45 to 60 weight % of a base solvent; from 5 to 10 weight % of at least one liquid aliphatic hydrocarbon; and from 5 to 12 weight % of organic solvent, wherein such components include or are selected from the components noted above. Notably, however, in these embodiments the PAC does not include at least one ethoxylated phenol derived surfactant. In these embodiments, the aromatic solvent is present in the PAC in above noted range and is or includes methylbenzene, 1,2-dimethylbenzene, 1,3 dimethylbenzene, p-xylene with one or two methyl radicals, o-xylene with one or two methyl radicals, and combinations thereof; the base solvent is present in the above noted range and is a heavy aromatic naptha; the liquid aliphatic hydrocarbon is present in the PAC in the above noted range and is or includes 1-methyl-4-(prop-1-en-2-yl)cyclohex-1-ene, (1S, 5S)-2,6,6-trimethylbicyclo[3.1.1]hept-2-ene, or a combination thereof; and the organic solvent is present in the PAC in the above noted range and is or includes an ester based solvent such as PRIFER 6813 or another suitable organic solvent.

In embodiments the PAC may be formulated to disperse water in heavy crude oil at a water:oil ratio ranging from 1:1 to 1:2 relative to the amount of PAC added to the heavy crude oil. In embodiments, the total water content of the PAC and heavy crude oil is in a range of 0-7 weight %, and preferably is in a range of 0-3 weight %. In embodiments if the heavy crude oil under consideration contains little or no water the water content of the heavy crude may be adjusted to greater than 0 to less than 7 weight % (e.g., greater than 0 to less than 3 weight %) by the addition of water and/or an amine soap. Non-limiting examples of amine soaps that can be used include amine soaps formed by neutralizing a tertiary amine that is also a triol (e.g., triethanolamine) with an aliphatic unsaturated fatty acid having one or two double bonds an alkyl chain containing from 6 to 18 carbon atoms, such as cis, cis-9,12-octadecadienoic acid, cis-9-octadecenoic acid, (Z)-octadec-9-enoic acid, (4Z, 7Z, 10Z, 13X, 16Z, 19Z)-docosa-4, 7, 10, 13, 16, 19-hexaenoic acid. In non-limiting embodiments the water content is adjusted by the addition of an amine soap, such as triethanolamine, diethanolamine monooleate, triethanolamine stearate, or a combination thereof. In embodiments, when the PAC is combined with heavy crude oil, the result should be the formation of a first oil composition that is in the form of a bipolar mixture that includes a dispersion of heavy crude oil-asphaltene cumuli.

The PAC may be added to heavy crude oil in an amount ranging from greater than 0 to about 10 weight %, such as from about 1 to about 5%, or even from about 2 to about 4 weight %, relative to the weight of the heavy crude oil. Without limitation, in embodiments the PAC is added to the heavy crude oil in an amount ranging from about 2 to about 3 weight %.

The PACs described herein may include or be used in conjunction with one or more additional surfactants. In embodiments, the additional surfactant(s) are included in the PAC, whereas in other embodiments the additional surfactant(s) are added to heavy crude oil separately from the PAC. Preferably, the additional surfactant(s) are added to the heavy crude oil separately from (e.g., before) the PAC. Without limitation, in embodiments the at least one additional surfactant includes a first surfactant and a second surfactant, each of which may be added to heavy crude oil in an amount ranging from greater than 0 to about 1 weight %, such as from about 0.1 to about 0.6 weight %, about 0.1 to about 0.4 weight % and preferably in an amount ranging from 0.1 to 0.3 weight %.

The first surfactant is or includes an ethoxylated fatty acid ester that can be reacted with 6 to 40 moles of ethylene oxide. In embodiments, the ethoxylated fatty acid ester is or includes a mixture of stearic acid and palmitic acid esters of sorbitol and its mono and dianhydrides. Ethoxylated fatty acid esters can also be prepared by the addition of several moles or ethylene oxide to a monoglycerol ester and, depending on the amount of ethylene oxide added, may have a wide range of HLB values. One example of the structure of a suitable first surfactant is shown as formula 1 below, in which R represents a fatty acid such as lauric acid, palmitic acid, oleic acid, stearic acid, or the like.

Formula 1

One example of a suitable ethoxylated fatty acid ester that can be used as or in the first surfactant is 2-(3,4-dihydroxyoxolan-2-yl)-2-hydroxyethyl] octadec-9-enoate, which is reacted with greater than 0 to 10 moles of ethylene oxide.

The second surfactant is or includes polyethoxylated sorbitan (polysorbate) and a fatty acid having from 12 to 18 carbon atoms. Non-limiting examples of the second surfactant include polyethoxyethylene (80) sorbitan monooleate, polyoxyethylene (20) sorbitan monooleate, and combinations thereof. The second surfactant may include hydrophilic groups in the form of polyethers, also known as polyoxyethylene groups. The second surfactant may have an ethoxylate grade in the range of 20 to 80 moles.

Another aspect of the present disclosure relates to systems for reducing the viscosity of heavy crude oil. In general, the systems include a feed tank that is configured to combine heavy crude oil with a PAC and optionally one or more additional surfactants to form a first oil composition. The system further includes a pump that is configured to convey the first oil composition to a cavitation system. As will be described in further detail later, the cavitation system is configured to subject the first oil composition with hydrodynamic cavitation to produce a second oil composition. The second oil composition has a viscosity $V2$ that is at least 40%, and preferably at least 60% less than the viscosity $V1$ of the heavy crude oil.

Figure 1:
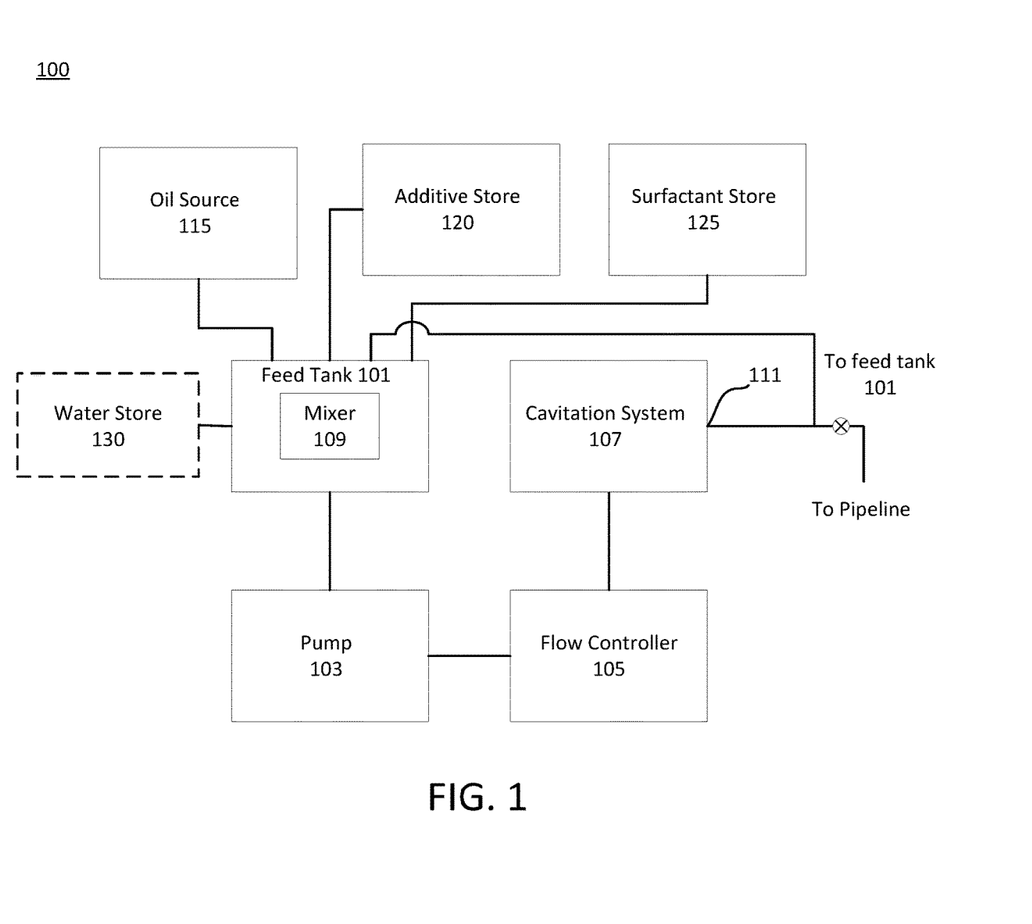
FIG. 1 is a block diagram of one example of a system for reducing the viscosity of heavy crude oil, consistent with the present disclosure illustrates one example of a fluid.

FIG. 1 is a block diagram of one example of a system for reducing the viscosity of heavy crude consistent with the present disclosure. As shown, system 100 includes a feed tank 101, a pump 103, a flow controller 105, and a cavitation system 107. Feed tank 101 may be a stainless steel or other suitable container that is configured to receive and combine heavy crude with a PAC consistent with the present disclosure.

As further shown in FIG. 1 feed tank 101 may be fluidly coupled with an oil source 115, which may be a heavy crude oil store, a wellhead, or the like. The heavy crude oil may have a viscosity $V1$ within a range of 900 to 1400 centistokes (or more) (cSt) at 40° C., such as from about 1000 to about 1250 cSt at 40° C., or even from about 1100 to about 1250 cSt at 40° C. In any case, oil source 115 may be configured to provide heavy crude oil for processing to feed tank 101. One or more manual or electronically controllable valves, gates, pumps, etc. (not shown) may be disposed between oil source 115 and feed tank 101 and operable to control the provision and metering of heavy crude oil to feed tank 101.

Feed tank 101 may also be fluidly coupled to additive store 120. In general, additive store 120 is configured to store and provide a PAC to feed tank 101. One or more manual or electronically controllable valves, gates, pumps etc. (not shown) may also be present between additive store 120 and operable to control the provision and metering of a PAC consistent with the present disclosure to feed tank 101. The details of the PAC that may be contained in additive store 120 are the same as those described above and thus are not reiterated.

Feed tank 101 may also be fluidly coupled to surfactant store 125. Surfactant store 125 is generally configured to store and provide one or more additional surfactants to feed tank 101. For example, surfactant store 125 may be configured to provide a first surfactant and a second surfactant as described above to feed tank 101. In that regard, surfactant store may include one or more containers for storing the first and second surfactants separately from one another, or for storing a mixture containing the first and second surfactants. One or more manual or electronically controllable valves, gates, pumps, etc. (not shown) may be present between surfactant store 125 and feed tank 101 and operable to control the provision and metering of surfactant(s) to feed tank 101.

FIG. 1. depicts an embodiment in which system 100 is configured such that surfactant store 125 can provide surfactant(s) to feed tank 101 through a direct fluid connection. Although useful, such a configuration is not required and system 100 may be configured differently. For example, surfactant store 125 may be fluidly coupled to additive store 120 and configured to provide surfactant(s) thereto. In such instances, additive store may be configured to mix or otherwise combine surfactant(s) received from surfactant store 125 with a PAC prior to providing a flow of PAC and surfactant to feed tank 101.

Feed tank 101 may also be fluidly coupled to an optional water store 130. When used, water store 130 is configured to store or provide water or another composition (e.g., an amine soap) that can be added to feed tank 101 to adjust the water content of a first oil composition contained therein. More specifically and as described above, feed tank 101 may receive crude oil from oil source 115, PAC from additive store 120, and surfactant(s) from surfactant store 125, and may combine (e.g., mix) such components to form a first oil composition. If desired, water, an amine soap, or other composition may also be added to the first oil composition from water store 130. For example, water, amine soap, or another composition may be added to adjust the amount of water in the first oil composition to within a desired range, such as from greater than 0 to about 10 weight %, such as from greater than 0 to about 7 weight %, or even from greater than 0 to about 3 weight %. In that regard, one or more manual or electronically controllable valves, gates, pumps, etc. (not shown) may be present between optional water store 130 and feed tank 101 and operable to control the provision and metering of water (or water content adjustment additives such as amine soap) to feed tank 101.

As noted above feed tank 101 is generally configured to form a first oil composition that includes at least heavy crude oil, PAC, surfactant(s), and optionally additional water or water content adjustment additives. In that regard feed tank 101 may include or otherwise be equipped to mix or otherwise combine heavy crude oil with the PAC, surfactant(s), and optional water content adjustment additives in any suitable manner. For example, and as shown in FIG. 1, feed tank 101 includes a mixer 109 (e.g., an overhead stirrer, paddle mixer, acoustic mixer, mechanical agitator, etc.) that is configured to combine (e.g., mix) heavy crude oil with the PAC, surfactant(s), and optional water content adjustment additives to form a first oil composition.

Although not shown in FIG. 1, system 100 may also be configured to heat the heavy crude oil and/or the first oil composition to a desired temperature or temperature range. In that regard, system 100 may include a heating apparatus (e.g., a jacket heater, resistive heater, heat exchanger, combination thereof, or the like) that is configured to heat the heavy crude oil and/or the first oil composition to a desired temperature range within feed tank 101. In embodiments, the heating apparatus is configured to heat heavy crude oil and/or a first oil composition in feed tank 101 to a temperature in the range of 30° C. to 60° C., such as 35° C. to 50° C., or even about 40° C.

Pump 103 and flow controller 105 are generally configured to convey the first oil composition from feed tank 101 to cavitation system 107 at a desired flow rate, such as but not limited to greater than 0 to about 15 liters/minute, such as from about 3 to about 5 liters/minute. Of course, such flow rates are for the sake of example only, and the first oil composition may be provided from feed tank 101 to cavitation system 107 at any suitable flow rate. As will be appreciated in the art, the flow rate used may depend on one or more factors, such as but not limited to the size and duty capacity of cavitation system, the viscosity (V1) of the heavy crude oil, the desired viscosity (V2) of a second oil composition produced by the cavitation system 107, combinations thereof, and the like.

Cavitation system 107 is generally configured to subject the first oil composition provided from feed tank 101 to hydrodynamic cavitation. As used herein, "hydrodynamic cavitation" refers to a processing technique that results in the sudden formation and collapse of bubbles in liquid by means of mechanical force. Hydrodynamic cavitation occurs when a reduction in pressure to the vapor tension level of the liquid is caused by hydrodynamic motion of the fluid, the characteristics of which may depend on the physical layer of flow passages within cavitation system 107. This contrasts with acoustic cavitation, which is induced by sound pressure waves (e.g., from ultrasonic waves) that are propagated through a liquid.

With the foregoing in mind, cavitation system 107 is generally configured to subject a first oil composition received from feed tank 101 to hydrodynamic cavitation. In that regard any suitable hydrodynamic cavitation system may be used as cavitation system 107. Non-limiting examples of suitable hydro dynamic cavitation systems that can be used include the shockwave power reactor (SPR) sold by Hydro Dynamics Inc. Detailed information concerning the SPR is provided at https://www.hydrodynamics.com/cavitation-technology/, the entire content of which is incorporated herein by reference. Additional examples of suitable hydrodynamic cavitation systems include the cavitation system described in U.S. Pat. No. 7,507,014, the entire content of which is incorporated herein by reference.

In embodiments, cavitation system 107 includes a rotor that spins around a shaft. The rotor includes a plurality of dead end cavities. As the rotor spins about the shaft, low pressure zones are created and collapsed within the dead end cavities, resulting in the production of shockwaves that propagate through a liquid or other material within the cavitation system. The cavitating action produced by the system can be adjusted by adjusting the rotational speed of the rotor, e.g., from greater than 0 to 120 Hertz (Hz) or more. Without limitation, cavitation system 407 is preferably configured to subject a first oil composition consistent with the present disclosure to hydrodynamic cavitation at a rotor rotational speed of greater than 0 to about 80 Hz, such as from about 20 to about 60 Hz, about 40 to about 60 Hz, or even at about 60 Hz.

As noted above, pump 103 and flow controller 105 are configured to convey a first oil composition from feed tank 101 to cavitation system 107. With that in mind, cavitation system 107 is configured to subject the first oil composition to hydrodynamic cavitation, resulting in the production of a second oil composition with a viscosity V2 (also referred to herein as a second viscosity), wherein V2 is at least about 40%, 45%, 50%, 55%, 60%, 65%, 70%, or even 75% less than the viscosity V1 of the untreated heavy crude oil in the first oil composition. Without limitation, V2 is preferably at least 40%, and more preferably at least 60%, less than V1. For example, when V1 is in a range of 1000 to 1250 cSt, V2 is preferably in a range of about 600 to 750 cSt (i.e., 40% less than V1), or even 400 to 500 cSt (i.e., 60% less than V1).

Another notable feature of the technologies described herein is that the viscosity V2 of the second oil composition may remain stable for an extended period without the need for the second oil composition to be retreated with hydrodynamic cavitation. For example, in embodiments the viscosity V2 of the second oil composition may remain stable (i.e., within +/−10% or even +/−5% of V2) for at least 3, at least 5, at least 7, at least 10, or even at least 14 days following initial hydrodynamic cavitation with cavitation system 107.

In embodiments system 100 is configured to subject an oil composition to hydrodynamic cavitation as the oil composition is circulated therethrough. For example, cavitation system 107 may be configured to subject a flow of the first oil composition to hydrodynamic cavitation as the first oil composition flows therethrough at a desired flow rate. Following hydrodynamic treatment in cavitation system 107, the resulting output may be directed through an outlet 111 after which it may be recirculated back to feed tank 101 (e.g., for further treatment), or directed out of the system (e.g., to a pipeline) as an outlet stream. Recirculation of the output from cavitation system 107 back to feed tank 101 may be desired when a single pass through cavitation system 107 does not produce an output with a viscosity V2 that is less than V1 by at least a target amount. By recirculating the output back to feed tank 101, the output will be subject to additional hydrodynamic cavitation treatment which can further reduce the viscosity of the oil composition to a desired range. Once the viscosity of the output (i.e., the second oil composition) reaches a desired amount (e.g., V2), a flow of the second oil composition with V2 may be drawn out of the system conducted to additional equipment for further processing and/or transport. For example, in addition to being fluidly coupled to feed tank 101, outlet 111 may be fluidly coupled to an inlet of a pipeline for transporting the second oil composition. Whether or not the composition is recirculated back to feed tank 101 or output from the system may be controlled by a manually or electronically controllable valve.

Another aspect of the present disclosure relates to methods for reducing the viscosity of heavy crude oil. In general, the methods include providing a first oil composition, wherein the first oil composition includes at least heavy crude oil with a viscosity V1, a PAC consistent with the present disclosure, optionally one or more additional surfactants, and optionally one or more water content adjustment additives. The method further includes subjecting the first oil composition to hydrodynamic cavitation to produce a second oil composition with a viscosity V2, wherein V2 is at least 40%, 45%, 50%, 55%, 60%, 65%, 70%, or even 75% less than V1. In embodiments, V2 is at least 40% and preferably at least 60% less than V1.

Figure 2:
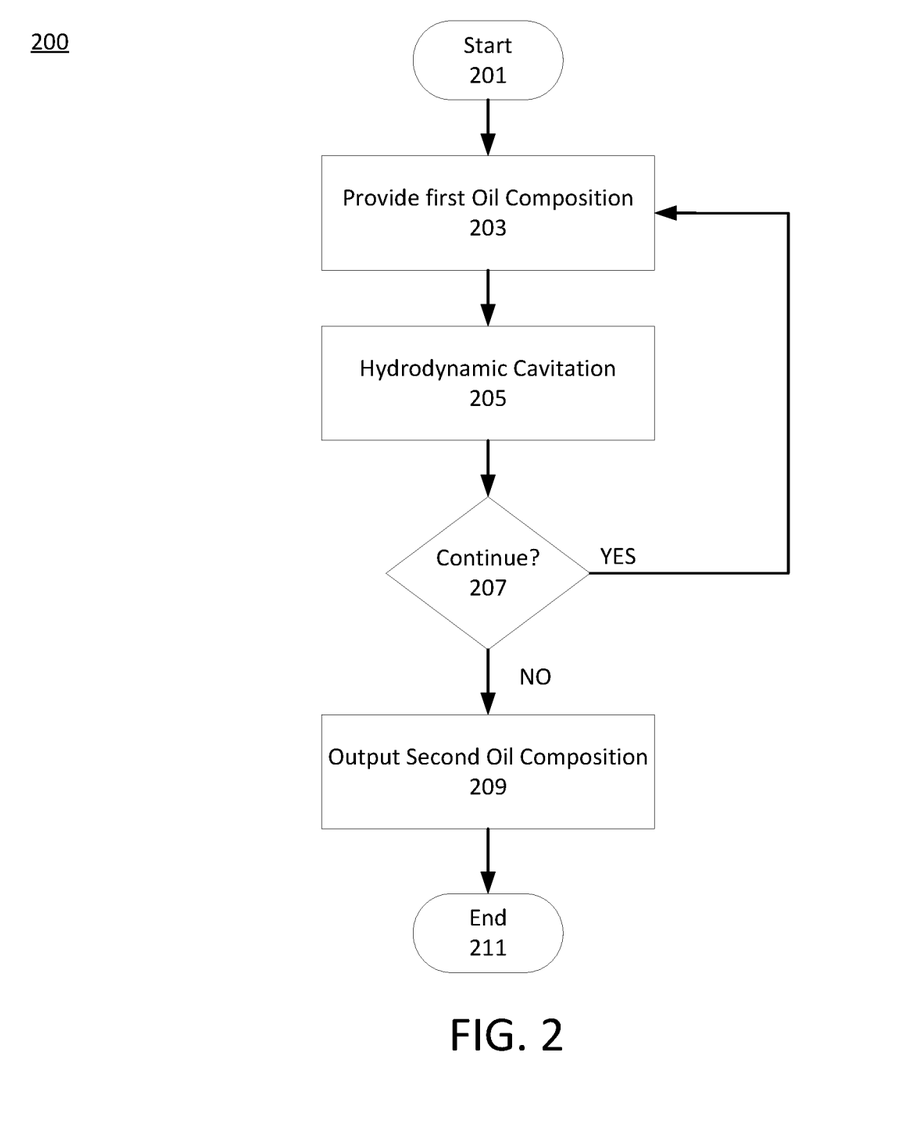
FIG. 2 is a flow chart of example operations of one example of a method of reducing the viscosity of heavy crude oil, consistent with the present disclosure.

Reference is now made to FIG. 2, which is a flow chart of example operations of one non-limiting example of a method of reducing the viscosity of heavy crude oil consistent with the present disclosure. Method 200 begins with start block 201, pursuant to which a first oil composition is provided. The first oil composition may be provided in any suitable manner. For example, and as described above, a first oil composition may be formed by mixing or otherwise combining heavy crude oil with a viscosity V1 with a PAC, one or more additional surfactants, and optionally one or more water content adjustment additives in a feed tank. The method may then proceed to block 205, pursuant to which the first oil composition is subject to hydrodynamic cavitation, e.g., using a hydrodynamic cavitation system such as a shockwave power reactor as discussed above. Following hydrodynamic cavitation method 200 may proceed to block 207, pursuant to which a determination may be made as to whether the method is to continue. The outcome of block 207 may be determined based on whether the viscosity of the oil composition after hydrodynamic cavitation has reached a target viscosity V2, wherein V2 is at least 40% and preferably at least 60% less than V1. If the viscosity of the oil composition following hydrodynamic treatment has not reached the target viscosity (i.e., V2), the outcome of block 207 may be YES and the oil composition may be recirculated back to the feed tank and subject to additional hydrodynamic cavitation treatment to further reduce its viscosity. If the viscosity of the oil composition has reached V2, however, the outcome of block 207 may be no and the method may proceed to block 209, pursuant to which a second oil composition with viscosity V2 may be output, e.g., for transport via a pipeline. The method may then proceed to block 211 and end.

EXAMPLES

Several experiments were performed to investigate the effectiveness of hydrodynamic cavitation and PAC on reducing the viscosity of heavy crude oil, specifically Beoridge heavy crude oil. The base kinematic viscosity of several samples of Be % ridge heavy crude oil was measured at 40° C. and the results were plotted in line 301 of FIG. 3. As shown, the base kinematic viscosity of the Belridge crude was about 1150 cSt, as shown by the points in line 301 of FIG. 3. In examples consistent with the present disclosure, 10 kg of Belridge heavy crude was added to a feed tank that was coupled to a cavitation system (a Lab Scale Shockwave Power Reactor (SPR) sold by Hydrodynamics Inc.). 0.25 weight % of a first surfactant (2-(3,4-Dihydroxyoxolan-2-yl)-2-hydroxyethyl] octadec-9-enoate) and 0.25 weight % of a second surfactant (Polyoxyethylene (80) sorbitan monooleate) were then added to the feed tank and mixed by hand for 10 minutes with the Belridge heavy crude. 2% by weight of a PAC (formulation 1, 2, or 3 as shown in Table 3 below) was then added to the feed tank. Water was added to adjust the water content of the examples including formulation 1 to 4.8 weight %, and to adjust the water content of the examples including formations 2 or 3 to 2.5 weight %. Each of the resulting mixtures were mixed by hand for 5 to 10 minutes to produce a first oil composition.

For each of the inventive samples, the first oil composition was pumped with a pump to the SPR at a flow rate of 4 liters per minute (1 pm). The first oil composition was circulated through the SPR and back to the feed tank about 5 minutes with the SPR turned off. The SPR was then turned on at a frequency of 20 Hz, and the frequency was increased at 20 Hz intervals until 60 Hz was achieved. Each inventive sample was subject to hydrodynamic cavitation in the SPR at a frequency of 60 Hz for ten minutes. The kinematic viscosity of the resulting second oil composition was then measured at 40° C. in accordance with ASTM D445-17a 71, section 1/97, and the results measured from each of the inventive examples were plotted in FIG. 3 as line 303. As shown, the samples processed in that manner had a viscosity V2 ranging from about 460 to about 700 cSt at 40° C. reflecting a 42 to 60% reduction in viscosity, relative to the viscosity (about ~1150 cSt) of the untreated Belridge crude.

Comparative Examples

Comparative examples were evaluated to demonstrate the effectiveness of the combination of PAC and hydrodynamic cavitation treatment relative to other processes, specifically acoustic cavitation. In each of the inventive examples 10 kg of Belridge heavy crude was added to a feed tank that was coupled to an acoustic cavitation system (FS30 sonicator sold by Fisher Scientific operated at 110W and 4 kHz) and heated to 40° C. 0.25 weight % of a first surfactant (2-(3, 4-Dihydroxyoxolan-2-yl)-2-hydroxyethyl] octadec-9-enoate) and 0.25 weight % of a second surfactant (Polyoxyethylene (80) sorbitan monooleate) were then added to the feed tank and mixed by hand for 10 minutes with the Belridge heavy crude. 2% by weight of a PAC (formulation 1 shown in table 3) was then added to the feed tank, and water was added to adjust the water content to 4.8 weight %. The resulting mixture was mixed by hand for 5 to 10 minutes to produce a first oil composition. The first oil composition for each of the comparative examples was pumped to the acoustic cavitation system. The first oil composition was circulated through the acoustic cavitation system and back to the feed tank for about 5 minutes with the acoustic cavitation system SPR turned off. The acoustic cavitation system was then turned on and the first oil composition was subject to acoustic cavitation for 20 minutes to produce a second oil composition.

TABLE 3

PAC formulations used in inventive examples

| | Formulation 1 | | Formulation 2 | | Formulation 3 | |
| --- | --- | --- | --- | --- | --- | --- |
| General Component | Specific Component | Amount (Wt. %) | Specific Component | Amount (Wt. %) | Specific Component | Amount (Wt. %) |
| Aromatic Solvent | Methylbenzene | 20-30 | Methylbenzene | 15-25 | Methylbenzene | 20-30 |
| Ethoxylated Phenol Derived Surfactant | None | None | 4-(2,4-dimethylheptan-3-yl)phenol ethoxylated with 6 to 10 moles of ethylene oxide | 5-15 | None | None |
| Base Solvent | Polyethyl (benzenes) | 45-60 | Polyethyl (benzenes) | 40-65 | Polyethyl (benzenes) | 45-60 |
| Liquid Aliphatic Hydrocarbon | 1-Methyl-4-(prop-1-en-2-yl)cyclohex-1-ene | 5-10 | 1-Methyl-4-(prop-1-en-2-yl)cyclohex-1-ene | 5-10 | 1-Methyl-4-(prop-1-en-2-yl)cyclohex-1-ene | 5-10 |
| Organic Solvent | Ester based solvent (PRIFER 6813) | 5-12 | Ester based solvent (PRIFER 6813) | 5-12 | Ester based solvent (PRIFER 6813) | 5-12 |

Figure 3:
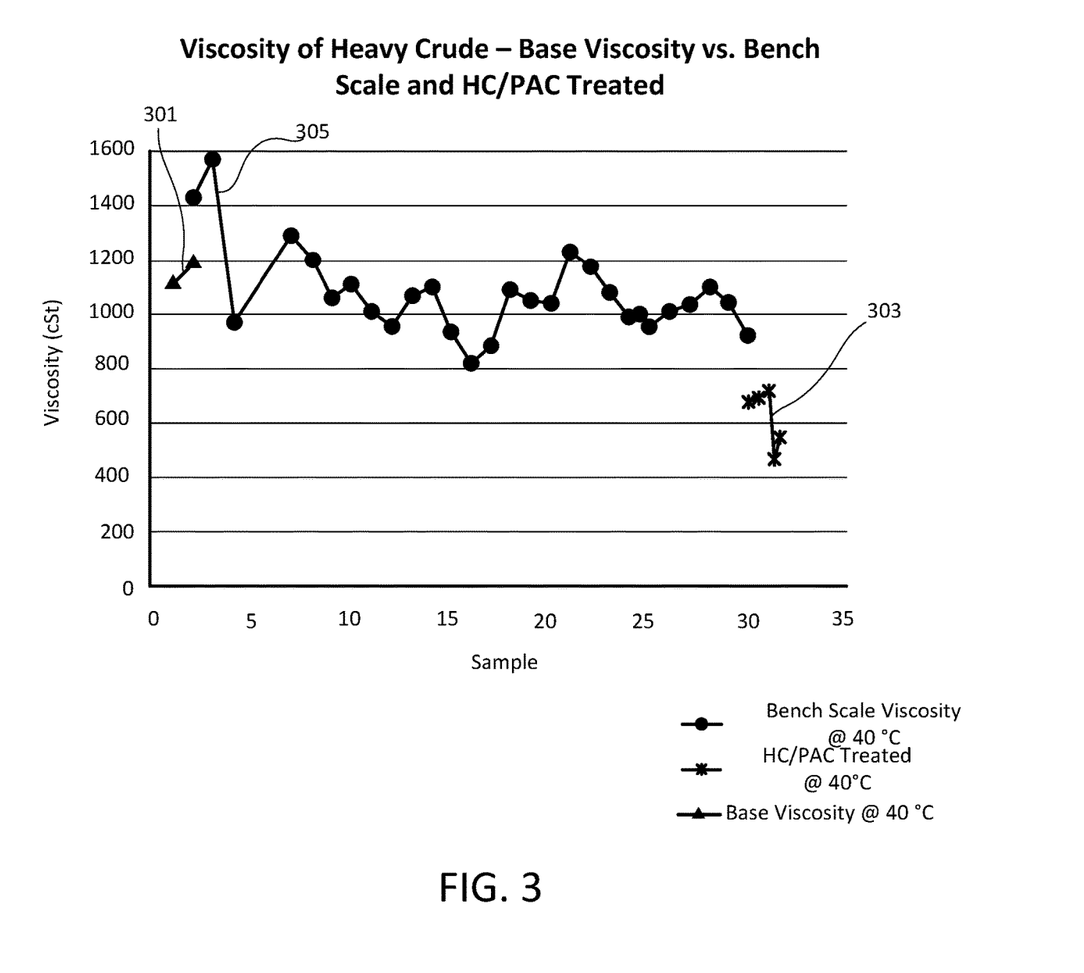
FIG. 3 is a plot of viscosity (at 40° C.) versus formulation number, for unprocessed samples of heavy crude oil, samples of heavy crude oil processed in accordance with the present disclosure, and samples of heavy crude oil processed by a comparative process.

The kinematic viscosity of the second oil composition produced in the comparative examples was measured at 40° C. in accordance with ASTM D445-17a 71, section 1/97 and the results are plotted as line 305 in FIG. 3. As shown, the kinematic viscosity of the comparative examples ranged from about 1600 cSt to about 926 cSt. This indicates that the comparative examples either negatively affected (e.g., increased) viscosity relative to the viscosity of the untreated Belridge crude, or were able to achieve a viscosity that was only about 19% less than the viscosity of the untreated Belridge crude.

As will be appreciated from the foregoing, the technologies described can achieve substantially reduce the viscosity of heavy crude oil. Without wishing to be bound by theory, it is believed that the PAC and hydrodynamic processing reduces viscosity of heavy crude oil breaking the asphatene-aggregated cumuli by reducing their cohesion force. More specifically, the use of a PAC in combination with hydrodynamic treatment can reduce the kinematic viscosity of heavy crude oil by at least 40% and preferably by at least 60%, making it substantially easier to transport such oils via pipeline and other means.

As used herein, the term "about" when used in connection with a value or a range, means+/−5% of the indicated value or the indicated endpoints of the range As used herein, the term "viscosity" refers to kinematic viscosity unless indicated to the contrary.

As used herein the term "fluidly coupled" means that a first and second component are coupled such that liquid and/or gas can flow between them, but it does not indicate that they are directly coupled to one another (i.e., with no intervening components). For example, first and second components may be fluidly coupled to one another—even if a third component is disposed between them—provided that liquid and/or gas can flow from the first component to the second component, e.g., via (or through) the third component.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method of reducing the viscosity of heavy crude oil, comprising:
   forming a first oil composition by combining at least a processing additive composition with a heavy crude oil having a viscosity V1, said processing additive comprising from 10 to 30 weight % of at least one aromatic solvent comprising one or more of methylbenzene, 1,2-dimethylbenzene, 1,3-dimethylbenzene, ethyl-benzene, p-xylene, or phenol, from 30 to 70 weight % of a base solvent comprising a heavy aromatic naphtha, from 2.5 to 12.5 weight percent of at least one liquid aliphatic hydrocarbon and from 2.5 to 15 weight percent of an organic solvent comprising one or more of n-methyl pyrrolidone, benzyl alcohol, dipropylene glycol dimethyl ether or ester based solvents; and
   subjecting the first oil composition to hydrodynamic cavitation to produce a second oil composition with a viscosity V2;
   wherein V2 is at least 40% less than V1.

2. The method of claim 1 wherein the processing additive composition further comprises: from 2.5 to 20 weight percent of at least one ethoxylated phenol derived surfactant.

3. The method of claim 2, wherein:
   said at least one aromatic solvent is present in said processing additive composition in an amount ranging from 15 to 25 weight %;
   said at least one ethoxylated phenol derived surfactant is present in said processing additive composition in an amount ranging from 5 to 15 weight %;
   said base solvent is present in said processing additive composition in an amount ranging from 40 to 65 weight %; and
   said liquid aliphatic hydrocarbon is present in said processing additive composition in an amount ranging from 5 to 10 weight %; and
   said organic solvent is present in said processing additive composition in an amount ranging from 5 to 12 weight %.

4. The method of claim 3, wherein said at least one ethoxylated phenol derived surfactant is [4-(2,4-dimethyl-heptan-3-yl)phenol and ethoxylates thereof.

5. The method of claim 3, wherein the base solvent comprises a heavy aromatic naphtha with a chain length between C8 and C18.

6. The method of claim 3, wherein the liquid aliphatic hydrocarbon comprises at least one cyclic monoterpene.

7. The method of claim 2, wherein forming said first oil composition further comprises combining at least one additional surfactant with said processing additive composition and said heavy crude oil.

8. The method of claim 7, wherein:
   said at least one additional surfactant comprises a first surfactant and a second surfactant;
   said first surfactant comprises an ethoxylated fatty acid ester; and
   said second surfactant comprises a polyethoxylated sorbitan and a fatty acid that includes from 12 to 18 carbon atoms.

9. The method of claim 1, further comprising adding water, amine soap, or a combination thereof to adjust a water content of the first oil composition.

10. The method of claim 1, further comprising heating said first oil composition prior to subjecting said first oil composition to said hydrodynamic cavitation.

11. The method of claim 1, wherein V2 is less than or equal to 40% of V1.

12. The method of claim 1, wherein V2 is at least 60% less than V1.

* * * * *